April 12, 1932.     I. S. GRANSTROM     1,853,728
MUSIC TABLE
Filed Oct. 23, 1929
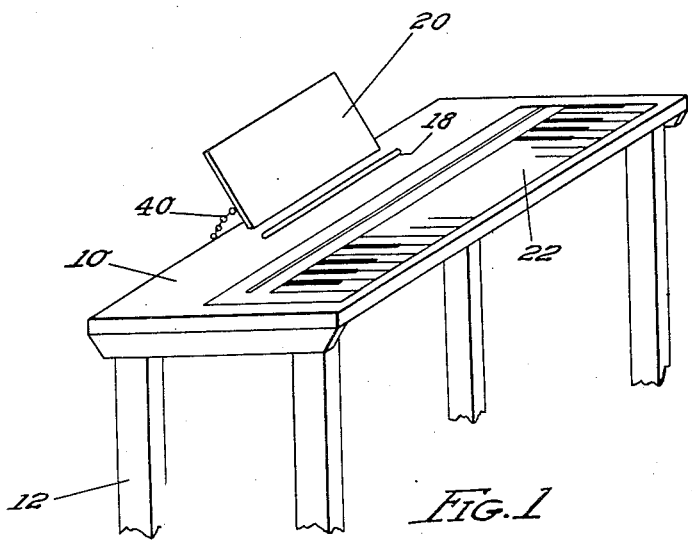
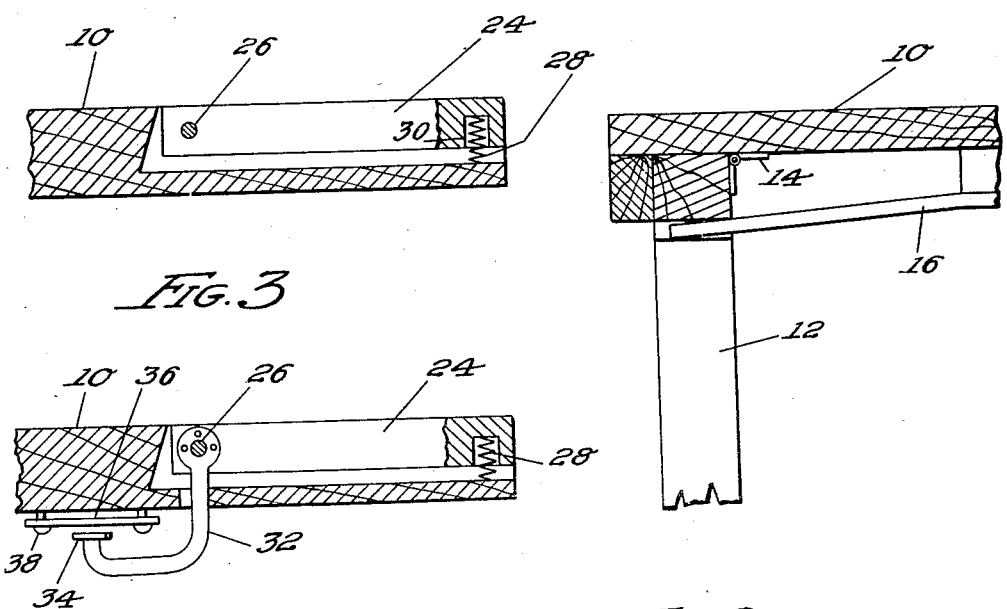
ISIDOR S. GRANSTROM
INVENTOR
PER Albert J. Fihe
ATTORNEY Patented Apr. 12, 1932

1,853,728

UNITED STATES PATENT OFFICE

ISIDOR S. GRANSTROM, OF CHICAGO, ILLINOIS

MUSIC TABLE

Application filed October 23, 1929. Serial No. 401,643.

This invention relates to an improved music table, and has for one of its principal objects the provision of a table for teaching music particularly the piano.

One of the important objects of this invention is to provide a table for use in teaching music particularly to children which shall at one and the same time embody within itself the representation of a keyboard of a piano having either fixed or relatively movable keys, and also a removable or foldable music book support together with foldable legs whereby the entire device can be packed into a small compass when not in use.

Another and further important object of this invention is to provide in a music table having foldable legs the combination of a clavier having either fixed or movable keys, and a foldable or removable music sheet support.

Another and still further important object of the invention is the provision in a table for teaching music of a clavier, having movable keys, each of which keys is associated with means for rendering a musical note of the piano or other scale whereby the teacher can determine by ear whether or not the pupil or pupils are striking the correct keys.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the improved music table of this invention.

Figure 2 is a detail view illustrating the preferred construction of the foldable legs.

Figure 3 is a sectional view showing the construction and operation of one of the keys of the clavier.

Figure 4 illustrates a modified form of the key arrangement.

As shown in the drawings:

The reference numeral 10 indicates generally the top of a table, the table being provided with foldable legs 12 which legs are hinged as at 14 and maintained in both extended and closed positions by means of resilient locking members or the like 16.

A pair of slots is formed in the top of the table, one of the slots being relatively shallow as illustrated at 18, this slot being for the supporting reception of the lower edge of a music book, sheet of music, instruction leaflet or the like. Directly behind the slot 18 and parallel thereto is a deeper slot in which is positioned the music book support 20, this support being preferably formed of multiply wood or of metal so as to eliminate any danger of splitting. Obviously also the table may be composed of wood, metal, or any suitable or desirable material. The slot in which the support 20 is positioned is angular with respect to the horizontal plane of the top of the table, thereby resulting in a correspondingly angular position of the support 20 whereby the sheets of music or the like are suitably supported in position for ready reference.

At the forward edge of the table is placed the representation of the keyboard of a piano or the like as shown at 22, and this may be either painted or otherwise inscribed upon the surface of the table or may be formed of an inlaid construction and may also be placed thereon by pasting to the top of the table a sheet of paper or the like having the required representations of the keys thereon. The paper after being glued to the table top may be varnished over so as to protect the same in use. Alternatively heavier cardboard may be used which is countersunk so as to be flush with the top of the table, or the insignia can be inscribed thereon by means of a decalcomania transfer or the like.

As best shown in Figure 3, actual movable keys may be fitted into the table top 10 by removing a portion of the table top and pivoting a number of keys or representations thereof 24 on a common pivot pin 26, a suitable space being left for vertical operation of the keys, and the tops of the same being normally maintained in the same plane as the top of the table by means of a helical spring or the like 28 positioned in a suitable socket 30 formed in the lower face of the forward portion of each key.

If desired, an arm 32 may be attached to the side face of each key adjacent the pivot point 26, this arm extending downwardly, thence rearwardly, and again upwardly, and terminating in a hammer element or the like 34 adapted to strike against a piece of metal or similar material 36 held in position to be vibrated upon two pins or screws 38 which allow of a loose motion of the plate 36 with respect to themselves and to the table.

Obviously by graduating the length, thickness, or other dimensions of the plates 36 sounds may be produced according to a scale, whereby the instructor can immediately determine by ear whether or not the pupil is fingering the proper key. A damping effect may be produced by simply holding the key 24 down against the upward pressure of the spring 28 after being struck.

It will be evident that herein is provided a music table which is particularly adapted for instructing children and others in the use of the piano or a similar instrument and which can be made quite cheaply while at the same time providing all of the necessary elements of such instruction. Further, each table can be readily folded so that a number of the same may be stored or packed in a comparatively small space when not in use, thereby allowing the space usually occupied by a number of such table to be utilized for other purposes. The construction of the leg retaining elements is such that there will be no collapse of the tables when in use, and further the legs will have no tendency to drop down from folded position while the tables are being transported from place to place. If desired, each of the music supports can be attached to the table by means of a small piece of chain or the like 40 whereby the same cannot become lost when pulled out of the corresponding slot and will always be available for use.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A music table including in combination a top, a clavier in the top, foldable legs supporting the top, and a removable music sheet support in the top, the music sheet support being mounted in a slot in the table top, and with a further slot parallel to said first-named slot for receiving the lower edge of said music sheet.

2. A music table including in combination, a top, a clavier in the top, foldable legs supporting the top, and a removable music sheet support in the top, said clavier comprising movable keys.

In testimony whereof I affix my signature.

ISIDOR S. GRANSTROM.